United States Patent
Volcker et al.

(10) Patent No.: US 10,504,536 B2
(45) Date of Patent: Dec. 10, 2019

(54) AUDIO QUALITY IN REAL-TIME COMMUNICATIONS OVER A NETWORK

(71) Applicant: GetGo, Inc., Boston, MA (US)

(72) Inventors: Bjorn Volcker, Svedala (SE); Matthieu Hodgkinson, Dresden (DE)

(73) Assignee: LogMeIn, Inc., Boston, MA (US)

( * ) Notice: Subject to any disclaimer, the term of this patent is extended or adjusted under 35 U.S.C. 154(b) by 86 days.

(21) Appl. No.: 15/827,387

(22) Filed: Nov. 30, 2017

(65) Prior Publication Data
US 2019/0164563 A1    May 30, 2019

(51) Int. Cl.
| | |
|---|---|
| G10L 21/02 | (2013.01) |
| G10L 21/0232 | (2013.01) |
| G10L 25/60 | (2013.01) |
| H04M 3/22 | (2006.01) |
| H04L 29/06 | (2006.01) |
| H04W 72/08 | (2009.01) |
| H04L 12/18 | (2006.01) |

(52) U.S. Cl.
CPC ...... *G10L 21/0205* (2013.01); *G10L 21/0232* (2013.01); *G10L 25/60* (2013.01); *H04L 12/1827* (2013.01); *H04L 65/80* (2013.01); *H04M 3/2236* (2013.01); *H04W 72/085* (2013.01)

(58) Field of Classification Search
CPC ..... G10L 25/60; G10L 21/0205; G10L 19/18; G10L 19/24; G10L 19/22; H04L 65/80; H04L 12/1827; H04L 65/1059; H04L 29/06027; H04M 3/2236; H04W 72/085; H04W 88/06
See application file for complete search history.

(56) References Cited

U.S. PATENT DOCUMENTS

| | | | | |
|---|---|---|---|---|
| 5,715,372 A | * | 2/1998 | Meyers | G10L 15/02 704/200 |
| 6,754,311 B1 | * | 6/2004 | Kampmeier | H04M 3/2236 379/24 |
| 6,963,860 B1 | * | 11/2005 | Tsutsui | G06Q 30/02 705/51 |
| 7,796,524 B1 | * | 9/2010 | O'Connell | H04L 41/5003 370/235 |

(Continued)

OTHER PUBLICATIONS

Joachim Pomy; "POLQA—The Next-Generation Mobile Voice Quality Testing Standard"; Apr. 27-29, 2011; 37 pages.

(Continued)

*Primary Examiner* — Eric Yen
(74) *Attorney, Agent, or Firm* — BainwoodHuang

(57) ABSTRACT

A technique for estimating and enhancing audio quality in a real-time communication session between parties over a computer network produces real-time measurements of factors that are known to impact audio quality, assigns a separate MOS value to each of the measured factors, and combines the MOS values for the various factors to produce an overall measure of audio quality. At least one party to the real-time communication session operates a computing device that runs a software program, and the technique further includes directing the software program to render an indication of the overall audio quality, thereby enabling the party operating the computing device to take remedial action to improve the audio quality.

20 Claims, 10 Drawing Sheets

(56) References Cited

U.S. PATENT DOCUMENTS

| | | | |
|---|---|---|---|
| 8,467,321 B1* | 6/2013 | Groenjes | H04L 12/1827 370/260 |
| 2002/0107593 A1* | 8/2002 | Rabipour | H04L 29/06 700/94 |
| 2004/0186731 A1* | 9/2004 | Takahashi | G10L 25/69 704/277 |
| 2007/0008899 A1* | 1/2007 | Shim | H04L 29/06027 370/252 |
| 2010/0152869 A1* | 6/2010 | Morrison | G06Q 10/0637 700/96 |
| 2011/0022358 A1* | 1/2011 | Han | G05B 19/0428 702/183 |
| 2011/0268023 A1* | 11/2011 | Srinivasan | H04W 72/085 370/328 |
| 2012/0062791 A1* | 3/2012 | Thakolsri | H04L 65/00 348/441 |
| 2015/0341824 A1* | 11/2015 | Ge | H04W 48/02 370/230 |
| 2016/0094479 A1* | 3/2016 | Dwarkha | H04L 47/12 370/232 |

OTHER PUBLICATIONS

"Perceptual Evaluation of Speech Quality (PESQ) Measurement Description"; Oct. 26, 2010; 3 pages.
ITU-T—Series G: Transmission Systems and Media, Digital Systems and Networks; Jun. 2015; 30 pages.
"VOIP Quality Monitoring Basics Mean Opinion Score(MOS)Calculation and Aggregation"; 2015; 8 pages.

* cited by examiner

AUDIO QUALITY IN REAL-TIME COMMUNICATIONS OVER A NETWORK

BACKGROUND

Communication technologies increasingly use computer equipment and computer networks for conveying voice and other audio content in real time between parties. For example, commercially-available computers, tablets, smart phones, and the like often include some form of audio chat, video chat, and/or web conferencing application, which is built in to the devices' operating systems and/or is readily available for download and installation on user devices. These communication technologies rely upon high-quality audio for their success.

Many factors can degrade audio quality in real-time communications, impairing user experience. For example, long network delays can cause latency or echo. Ambient and electronic noise can impair intelligibility. Dropped network packets can introduce pops, crackles, and robotic-sounding speech. Damaged or improperly placed microphones and speakers can cause distortion and insufficient volume.

Various approaches are known in the art for estimating audio quality in electronic communications. For example, the ETSI (European Telecommunications Standards Institute) has developed the E-model for estimating conversational quality from the mouth of a speaker to the ear of a listener over an electronic medium. The E-model includes terms that specify various impairments, e.g., delays, low bit-rate codecs (encoder/decoders), packet losses, and the like. Additional information about the E-model may be found in "*G.107: The E-model: a computational model for use in transmission planning,*" which may be found online at https://www.itu.int/rec/T-REC-G.107-201506-I/en. In addition, PESQ (Perceptual Evaluation of Speech Quality) provides a family of standards for automated assessment of speech quality as experienced by a user of a telephony system. PESQ is standardized as ITU-T recommendation P.862. Further, MOS (Mean Opinion Score) provides an assessment of audio quality based on scores provided by human subjects. Various forms of MOS are standardized as ITU-T recommendation P.800.1.

SUMMARY

Unfortunately, conventional approaches to estimating audio quality are limited in their applications. The E-model is primarily intended for offline network planning, i.e., for designing a network to support audio communications, with certain specific sources of audio distortion in mind and without the ability to easily extend to new sources of audio distortion. Further, the E-model requires a high level of expertise to properly use and is not something that can easily be learned by novices. PESQ and MOS generally require comparisons with a reference signal, but reference signals are usually not available during real-time communications.

In contrast with prior approaches, an improved technique for estimating and enhancing audio quality in a real-time communication session between parties over a computer network produces real-time measurements of factors that are known to impact audio quality, assigns a separate MOS value to each of the measured factors, and combines the MOS values for the various factors to produce an overall measure of audio quality. At least one party to the real-time communication session operates a computing device that runs a software program, and the technique further includes directing the software program to render an indication of the overall audio quality, thereby enabling the party operating the computing device to take remedial action to improve the audio quality. Advantageously, embodiments of the improved technique operate in real time, are extendable to new sources of audio distortion, and are easy for application developers and information technology professionals to learn and use.

According to some embodiments, combining the assigned MOS values is performed by a server apparatus coupled to each of the computing devices over the computer network. In some examples, the technique further includes the server apparatus directing the software program to display a message on the computing device, the message providing a recommendation of a particular remedial action for improving the overall audio quality. In some examples, the technique further includes the server apparatus directing the software program to change a setting to improve the overall audio quality.

According to some embodiments, the technique further includes generating a per-party audio quality measure for each party to the communication session, and directing the software program to render a respective indication of the per-party audio quality measure for each party to the real-time communication session, such that the party operating the computing device is enabled to see, via the software program, the indication of the per-party audio quality measure of each other party participating in the communication session.

According to some embodiments, assigning a respective MOS value to each of the measured audio factors includes receiving the measured audio factor as a raw value and converting the raw value to the respective MOS value. In some examples, converting the raw value to the respective MOS value includes, for at least one measured audio factor: performing prior off-line testing on human subjects, the human subjects assigning subjective quality scores to audio at each of multiple raw value levels of the audio factor, each of the multiple raw value levels corresponding to a respective level of audio degradation in the audio factor with all other audio factors held constant; computing a mean quality score across the human subjects for each of the multiple raw value levels; constructing a mapping that associates raw value levels with corresponding mean quality scores; and applying the mapping to convert the raw value to the respective MOS value. In other examples, converting the raw value to the respective MOS value includes, for at least one measured audio factor: performing prior off-line characterization of multiple raw value levels of the audio factor using VQT (Voice Quality Testing), the characterization using VQT providing a mapping between the raw value levels and corresponding MOS values; and applying the mapping to convert the raw value to the respective MOS value.

According to some embodiments, combining the assigned MOS values to produce the overall measure of audio quality includes converting each of the assigned MOS values to a corresponding factor probability, each factor probability indicating a probability that the respective MOS value indicates bad audio.

According to some embodiments, the technique further includes identifying a reference quantile, the reference quantile representing a particular percentile opinion score that subjective human listeners have assigned to un-degraded, reference audio. In some examples, converting each of the assigned MOS values to a respective factor probability includes, for each of the assigned MOS values: constructing a distribution of quality values whose mean equals the assigned MOS value; computing a cumulative probability value as a summation of the constructed distribution of quality values up to the reference quantile; and providing the cumulative probability value as the factor probability.

According to some embodiments, combining the assigned MOS values to produce the overall measure of audio quality further includes combining the factor probabilities to generate an overall probability of bad audio. In some examples, combining the factor probabilities includes computing the overall probability of bad audio as a product of the factor probabilities divided by a sum of (i) the product of the factor probabilities and (ii) a product of complements of the factor probabilities.

According to some embodiments, converting the overall probability of bad audio to the overall MOS value includes constructing an overall distribution whose inverse CDF (cumulative distribution function) maps the overall probability of bad audio to the reference quantile; and providing the overall MOS value as a mean of the overall distribution.

According to some embodiments, at least one of the multiple audio factors includes multiple sub-factors having different causes but contributing to a common perceptual effect. In some examples, the multiple sub-factors for one of the multiple audio factors include (i) packet loss in transmitting audio between two of the computing devices and (ii) clipping of audio signals.

Certain embodiments are directed to a method of improving audio quality in real-time communications over a computer network. The method includes generating, during a real-time communication session over the computer network between multiple parties operating respective computing devices, real-time measurements of multiple audio factors of the communication session, each of the audio factors being susceptible to degradation in a way that affects an audio quality of the communication session. The method further includes assigning a respective MOS (Mean Opinion Score) value to each of the measured audio factors, each MOS value providing a measure of quality of the respective audio factor independent of other audio factors. The method still further includes combining the assigned MOS values to produce an overall measure of audio quality and directing a software program running on one of the computing devices to render an indication of the overall audio quality, the indication enabling the party operating the computing device to take remedial action to improve the overall audio quality.

Other embodiments are directed to a computerized apparatus constructed and arranged to perform a method of improving audio quality in real-time communications over a computer network, such as the method described above. Still other embodiments are directed to a computer program product. The computer program product stores instructions which, when executed on control circuitry of a computerized apparatus, cause the computerized apparatus to perform a method of improving audio quality in real-time communications over a computer network, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for estimating and enhancing audio quality in a real-time communication session between parties over a computer network produces real-time measurements of factors that are known to impact audio quality, assigns a separate MOS value to each of the measured factors, and combines the MOS values for the various factors to produce an overall measure of audio quality.

Figure 1:
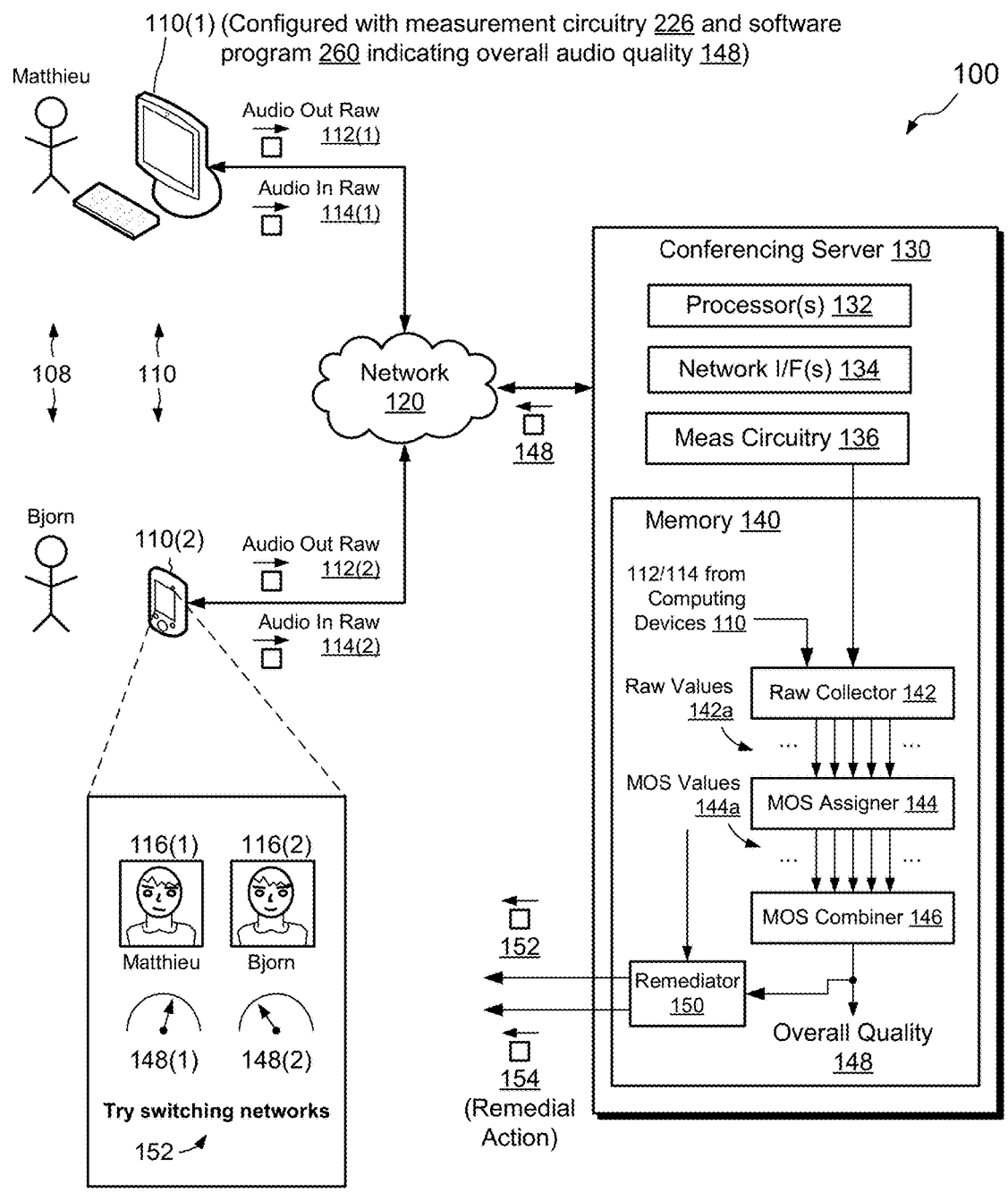
FIG. 1 is block diagram of an example environment in which embodiments of the improved technique can be practiced.

FIG. 1 shows an example environment 100 in which embodiments of the improved technique hereof can be practiced. Here, multiple computing devices 110, such as devices 110(1) and 110(2), are coupled to a network 120, using wired and/or wireless technology. The computing devices 110 may be any type or types of network-connectable devices capable of running software and of supporting audio communications. Examples of computing devices 110 may include desktop computers, laptop computers, tablets, smartphones, PDAs (personal data assistants), set top boxes, intercoms, and the like. The network 120 may be any type of network or combination of networks suitable for conveying computer network traffic, such as a local area network (LAN), a wide area network (WAN), the Internet, a cable television network, and/or some other type of network or combination of networks.

The computing devices 110 are configured to enable users 108 to engage in communication sessions online. Communication sessions may take the form of audio chats, VOIP (voice over Internet protocol) telephone calls, video chats (which include audio), web conferences, web-based educational events, webinars, customer service chats, or the like. In an example, each of the computing devices 110 runs a software program 260, such as an application, process, service, or daemon, for establishing and participating in communication sessions. Each of the computing devices 110 may also include a microphone, speakers, and a display, such as a passive screen or touchscreen. These may be provided as integrated or external components. The microphone and speakers may be provided as user-wearable headset or in any other suitable fashion.

In some examples, one or more of the computing devices 110 include measurement circuitry 226 for measuring factors related to audio quality from their own local perspectives. Factors may include incoming factors, which relate to audio to be sent to speakers, and outgoing factors, which relate to audio captured by a local microphone. Outgoing factors may also relate to synthetic content generated by the respective computing device 110, such as sound effects. Each factor may be measured by a respective detector, and the measurement circuitry 136 may include any number of detectors. Examples of factors measured by detectors include the following:

- Whether speakers are connected, turned on, and/or set to non-zero output volume;
- Whether a microphone is connected, turned on, and set to non-zero input volume;
- Whether speakers and/or a microphone are producing distortion (e.g., using self-test and/or audio feedback from the speakers to the microphone);
- Whether the microphone circuitry is clipping;
- Self-test results of electronics used in processing incoming and/or outgoing audio signals;
- Parameters of digital signal processing applied to incoming and/or outgoing audio signals;
- The sampling rate of an audio codec for encoding outgoing audio signals and/or for decoding incoming audio signals;
- The type of audio codec used for encoding and/or decoding audio signals;
- Upload and/or download network transmission speeds;
- Whether and/or to what extent network packets are dropped in sending and/or receiving audio signals over the network 120;
- Round-trip network delay to the conference server 130;
- Round-trip network delay to each of the other computing devices 110.

The particular listed factors are intended to be illustrative rather than limiting. Detectors of the measurement circuitry 226 may be implemented using hardware, e.g., sensors, analog circuitry, digital circuitry, and/or processors, or by using software, firmware, or any combination of hardware, software, and firmware.

In some examples, the environment 100 includes a service provider, such as a conferencing server 130, which acts as an audio bridge and/or provides other communication services, such as video, text-based chat, file sharing, and the like. The conferencing server 130 is seen to include a set of processors 132 (e.g., one or more processing chips and/or assemblies), a set of network interfaces 134 (e.g., one or more network cards, chips, and/or assemblies), measurement circuitry 136, and memory 140. Measurement circuitry 136 is similar to measurement circuitry 226 but includes detectors for measuring factors from the point of view of the conferencing server 130, such as network speed, dropped packets, round-trip delays to each of the computing devices 110, and parameters of any codecs used for resampling audio.

The memory 140 may include both volatile memory, e.g., Random Access Memory (RAM), and non-volatile memory, such as one or more ROMs (Read-Only Memories), disk drives, solid state drives, and the like. The set of processors 132 and the memory 140 together form control circuitry, which is constructed and arranged to carry out various methods and functions as described herein. Also, the memory 140 includes a variety of software constructs realized in the form of executable instructions. These include raw collector 142, MOS assigner 144, MOS combiner 146, and remediator 150. When the executable instructions are run by the set of processors 132, the processors 132 are caused to carry out the operations of the software constructs. Although certain software constructs are specifically shown and described, it is understood that the memory 140 typically includes many other software constructs, which are not shown, such as an operating system, various applications, processes, and daemons.

In example operation, users 108 operate respective computing devices 110 to engage as parties in a communication session over the network 120. For example, each user 108 may operate the software program 260 on a respective computing device 110 to join a call or conference. The conferencing server 130 may establish the communication session and merge audio feeds from the computing devices 110, thus enabling each of the computing devices 110 to send audio to each of the other computing devices 110. Users 108 of the computing devices 110 can thus speak to one another and be heard.

Each of the computing devices 110 may manage two audio streams: one for incoming audio, to be routed to local speakers, and another for outgoing audio, to be sent to the other computing devices 110, e.g., via the conferencing server 130, over the network 120. In the course of processing each audio stream, detectors of measurement circuitry 136 in that audio stream generate measurements of respective audio factors. For example, an incoming detector may measure packet loss of an incoming audio signal, while an outgoing detector may measure a sampling rate employed by an audio codec that encodes audio originating from a local microphone. Each of the detectors may generate a raw value as a measurement, and the computing device 110 may send the raw values to the conferencing server 130 for collection and processing. For example, computing device 110(1) may send raw values 112(1) of outgoing audio, generated by detectors in the outgoing audio stream, and may also send raw values 114(1) of incoming audio, generated by detectors in the incoming audio stream. Computing device 110(2) may perform similar acts, generating raw values 112(2) for outgoing audio and raw values 114(2) for incoming audio.

The conferencing server 130 receives raw values 112 and 114 from the computing devices 110 and collects them in raw collector 142, which may also collect output from detectors in measurement circuitry 136. In some examples, raw collector 142 performs pre-processing on raw values 112 and 114. For example, raw collector 142 may combine raw values from detectors that measure audio factors which, when degraded, tend to produce a common perceptual effect in a listener. For example, if a high degree of packet loss tends to produce distorted audio that sounds the same to a typical user as audio distorted by clipping, then raw collector 142 may combine raw values from a detector for packet loss with raw values from a detector for clipping and represent both values as a single output. Other raw values may simply be passed through, unaltered and without being combined with other factors.

Raw values 142a from raw collector 142 pass to MOS assigner 144, which assigns a respective MOS (mean opinion score) value 144a to each of the raw values 142a. For example, a particular detector may produce a raw value 142a that varies between 0 and 1, and the MOS assigner 144 may assign the raw value 142a a corresponding MOS value 144a that varies between 1 and 5. Thus, for example, a raw value of 0.5 might produce a MOS value of 3, whereas a raw value of 0.7 might produce a MOS value of 4.

The relationship between raw scores 142a and MOS values 144a is not necessarily linear and is preferably established based on off-line testing. For example, human subjects may be exposed to audio signals having reference-level quality in all respects except for one test factor, which is measured by a particular detector (or group of combined detectors) and represented by one raw value 142a. The human subjects listen to audio samples in which the test factor is degraded by different levels, with all other audio factors held constant at reference levels, and assign opinion scores to the audio at each level of degradation. The opinion scores across all human subjects are averaged at each degradation level to produce a mean opinion score (MOS) for each level. When repeated across all levels of degradation of the test factor, a mapping is produced for the test factor between levels of the raw value 142a and corresponding MOS values 144a. Later, when performing real-time audio quality estimation, the MOS assigner 144 receives a raw value 142a for the test factor and applies the mapping to identify a corresponding MOS value 144a. The MOS assigner 144 may employ interpolation when levels of the raw value 144a fall between test levels used when generating the mapping. One should appreciate that the MOS assigner 144 may employ a look-up table, curve fitting, or any other suitable construct for converting raw scores 142a to corresponding MOS values 144a. Similar activities may be performed for all audio factors to produce respective mappings (one for each audio factor or group of combined audio factors), and the mappings may be applied in real time to generate respective MOS values 144a.

In another example, mappings between raw values 142a and corresponding MOS values 144a are established offline using VQT (Voice Quality Testing) software, such as POLQA (perceptual objective listening quality assessment), PESQ (Perceptual Evaluation of Speech Quality), or ViSQOL (Virtual Speech Quality Objective Listener). For example, a test system using VQT software receives a first input carrying a reference (non-degraded) audio signal and a second input carrying a test audio signal that is degraded for a particular audio factor but that has reference levels for all other audio factors. At each level of degradation of the audio factor, as represented by a respective raw value 142a, the test system produces a corresponding MOS value. Associations between raw values 142a and MOS values are arranged to produce a mapping. As before, the mapping may take the form of a look-up table, a fitted curve, or any other suitable construct that enables real-time conversions of raw values 142a to corresponding MOS values 144a.

One should appreciate that mappings between raw values 142a and MOS values 144a may be established using other approaches, such as MUSRA (MUltiple Stimuli with Hidden Reference and Anchor), and may use approaches other than testing on human subjects or VQT. For example, a single human can assign mappings based on subjective impressions. Also, a computer program not running VQT software may assign mappings. Although not recommended, a standard mapping may be applied, such as the same mapping for all factors. The particular examples described are thus not intended to be limiting.

Once MOS assigner 144 has produced MOS values 144a across all audio factors (or any desired number of them), MOS combiner 146 combines the MOS values 144a to produce an overall measure of audio quality 148. The MOS combiner 146 may express overall audio quality as a MOS value, as a probability, or in any other suitable manner. In addition, MOS combiner 146 may combine MOS values 144a using any suitable technique, such as by computing averages of MOS values 144a, computing weighted averages, or by using a more advanced approach, such as the one described in a later portion of this document.

In some examples, MOS combiner 146 produces only a single measure of overall audio quality 148, which applies to all parties engaged in the communication session. In other examples, MOS combiner 146 produces multiple measures of overall audio quality 148, such as one measure for each party to the communication session. The overall quality measure 148 for each party may represent an estimate of the quality of audio rendered to that party, e.g., as played on speakers of that party's computing device 110. To this end, MOS combiner 146 may aggregate MOS values 144a on a per-party basis and may limit MOS values 144a used to compute measures of overall quality to those aggregated for the respective party.

For example, to produce an overall quality measure 148(1) for computing device 110(1), the MOS combiner 146 may aggregate MOS values 144a derived from raw values 114(1) (audio in for 110(1)) with MOS values 144a derived from raw values 112(2) (audio out for 110(2)). MOS combiner 146 may further include in the aggregation MOS values derived from detectors in measurement circuitry 136 in conferencing server 130, which are in the audio processing path to computing device 110(1). Likewise, to produce an overall quality measure 148(2) for computing device 110(2), the MOS combiner 146 may aggregate MOS values 144a derived from raw values 114(2) (audio in for 110(2)) with MOS values 144a derived from raw values 112(1) (audio out for 110(1)). MOS combiner 146 may further include in this aggregation MOS values derived from detectors in measurement circuitry 136 that are in the audio processing path to computing device 110(2). MOS combiner 146 may operate in similar ways for other parties (if any) to produce respective measures of audio quality for those parties.

Conferencing server 130 may then send the computed measure (or measures) of overall audio quality 148 over the network 120 to the computing devices 110. The software programs 260 running on the computing devices 110 receive the measure or measures of audio quality 148 and render them to the parties via respective displays. For example, a software program 260 running on computing device 110(2) renders measures of audio quality 148(1) and 148(2) on a local display (e.g., a touchscreen). The software program 260 may render measures of overall audio quality 148(1)

and 148(2) in any suitable manner, such as by using graphical elements, text, and/or colors. Here, graphical elements depicting simulated gauges are shown. The software program 260 has rendered the gauges next to avatars 116(1) and 116(2) representing the users 108 of the computing devices 110 participating in the communication session. It can thus be seen that Matthieu's audio quality is good whereas Bjorn's is not quite as good. Perhaps Bjorn's audio is suffering from packet loss, a slow network connection, or a damaged speaker.

One should appreciate that there are myriad ways that the software program 260 may render measures of audio quality. For instance, bars may be used in place of gauges, with illuminated lengths of the bars reflecting the levels of audio quality. Colors may indicate audio quality, as well, with red, yellow, and green reflecting poor, fair, and good audio quality, respectively. The particular examples described are not intended to be limiting.

Referring back to the conferencing server 130, it is seen that remediator 150 is configured to receive values of overall audio quality 148 as well as MOS values 144a and to send messages 152 over the network 120 to computing devices 110 recommending remedial actions. For example, remediator 150 includes a knowledge base (not shown) that associates levels of MOS values 144a for particular audio factors with corresponding messages 152 that specify remedial actions that may be taken to raise those MOS values 144a. If overall audio quality 148 falls below a predetermined threshold, or if any MOS value does, remediator 150 may access the knowledge base, identify one or more corresponding messages 152, and send the messages to the affected computing device 110 or devices. In the case of FIG. 1, remediator 150 has determined that a MOS value 144a corresponding to network speed for computing device 110(2) is low, and has sent a message 152 to computing device 110(2), directing the user to "Try switching networks." The user may then decide whether to follow the recommendation, e.g., by switching from a cell phone network to a local Wi-Fi network. Assuming the user does switch networks, a detector in measurement circuitry 136 of computing device 110 may measure the increased network speed and send an updated raw value for network speed to the conferencing server 130, which may proceed to compute a new overall audio quality value 148(2) and send the new value back to computing device 110(2), causing the gauge display for 148(2) to respond, in real time, to the improved audio condition, e.g., by rotating the displayed needle a few degrees clockwise.

In some examples, the knowledge base further associates the levels of MOS values 144a with corresponding instructions 154 to change one or more settings on an affected computing device 110, e.g., in order to raise MOS values 144a that are found to be low. For instance, instructions may specify a change to a volume setting, sampling rate, or selection of available networks. The remediator 150 may access the knowledge base, identify one or more instructions 154, and send the instructions 154 to the affected computing device 110. The software program 260 on the affected computing device 110 may receive the instructions 154 and implement them to improve its audio quality. The computing device 110 may implement the instructions 154 with or without user input or confirmation, e.g., the computing device 110 may update settings automatically or semi-automatically. As before, a change in settings causes a change in a detector measurement, which may result in a new value of overall quality, which will be reflected in real time in the gauge display for 148(2).

Providing separate indicators for audio quality on a per-party basis can offer direct benefits to the parties. Each party is able to see, on that party's local display, an estimate of audio quality received by each of the other parties. Each party can therefore tell whether any other party might be having trouble hearing, and can compensate by speaking up, getting closer to a microphone, hanging up and calling back in, and so forth. The need for explicit discussions about audio quality or any self-consciousness that may arise from such discussions is therefore reduced.

One should appreciate that estimates 148 of overall audio quality are updated in real time on a near-continuous basis from the human perspective, such that changes in audio quality can be quickly detected and managed while the communication session is ongoing. In some examples, the conferencing server 130 may update estimates of audio quality periodically, such as every second. To avoid rapid changes in settings, which might be distracting to users, moving averages or other filtering techniques may be applied.

Further, activities ascribed herein to the conferencing server 130 may alternatively be performed by the computing devices themselves. For example, each computing device 110, or any of them, may include its own raw combiner 142, MOS assigner 144, MOS combiner 146, and remediator 150, for generating a measure 148 of overall audio quality for itself and/or other parties, and for performing remediation.

Further still, detectors in measurement circuitry 136 and 226 may be distributed throughout the environment 100 in any sensible way. Thus, for example, some embodiments may provide detectors in computing devices 110 but not in the conferencing server 130, or in only some computing devices or in one computing device. Other embodiments may provide detectors only in conferencing server 130. Still other embodiments may provide detectors in other locations, such as in network components, e.g., routers, switches, etc., or in separate computers tasked with monitoring audio network traffic.

Figure 2:
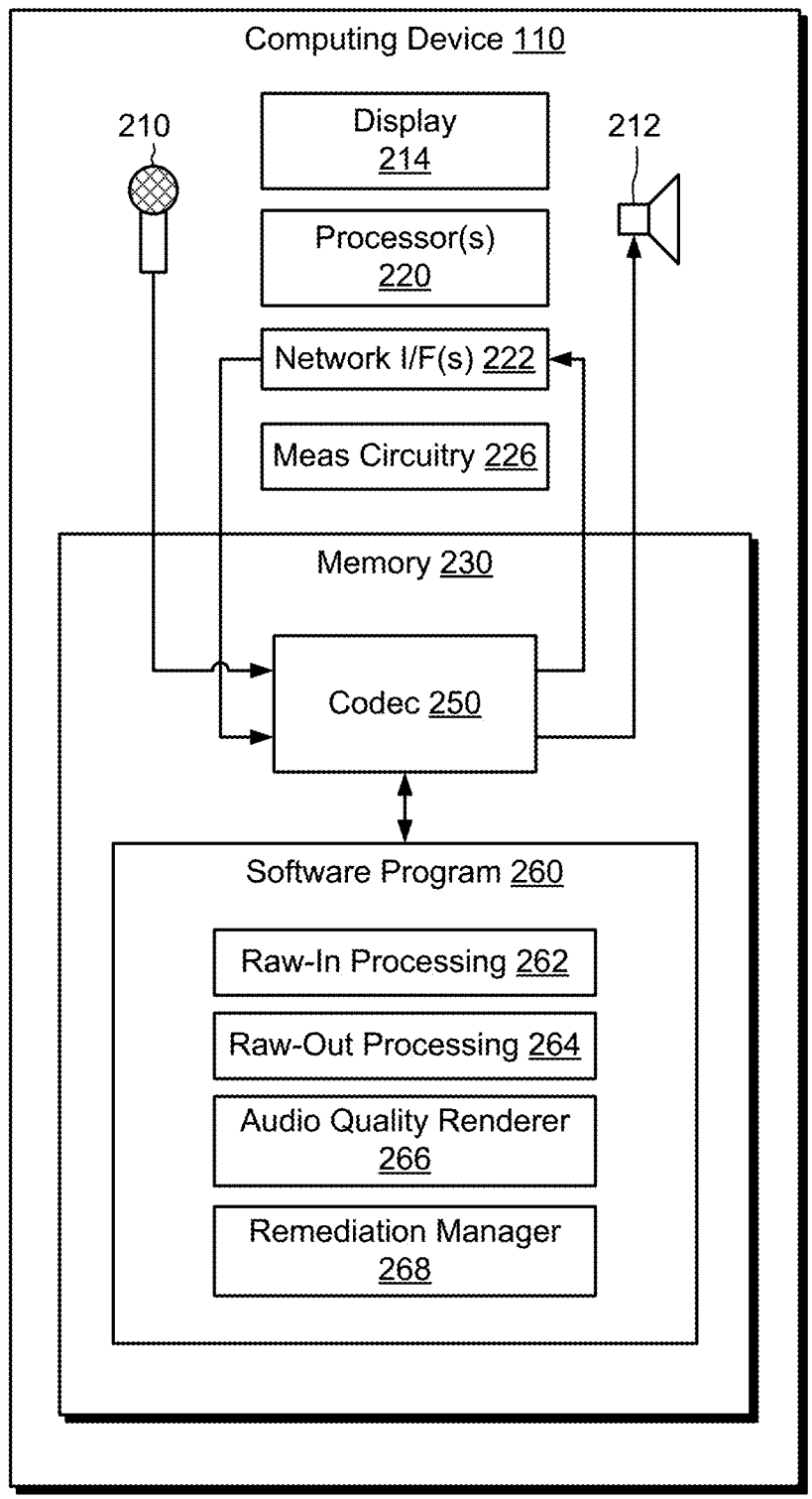
FIG. 2 is a block diagram of an example computing device of FIG. 1.

FIG. 2 shows an example arrangement of a computing device 110 in greater detail. The depiction in FIG. 2 is intended to be representative of computing devices 110, although it is recognized that different computing devices 110 may vary in their particular design and construction. Computing device 110 is seen to include a display 214, such as a touchscreen or flat panel display, a set of processors 220, such as one or more processing chips and/or assemblies, a set of network interfaces 222, such as one or more network interface cards, chips or assemblies, the above-described measurement circuitry 226, and memory 230. In some examples, computing device 110 further includes a microphone 210 and speakers 212. The microphone 210 and speakers 212 may be built-in or provided externally. In some examples, the microphone and speakers are parts of a headset, headphones, or ear buds. The microphone 210 may be part of a webcam or may be provided in any other suitable way.

The memory 230 is seen to "include," i.e., to realize by operation of software instructions and data, a codec (encoder/decoder) 250 and the above-described software program 260. The codec 250 encodes and compresses audio received from the microphone 210, e.g., in preparation for outgoing transmission over the network 120. The codec 250 also decompresses and decodes incoming audio, e.g., audio signals received over the network 120 from other computing devices 110 and/or from the conferencing server 130. In some examples, the codec 250 supports both audio and video. The software program 260 includes raw-in processing 262, raw-out processing 264, audio quality renderer 266, and remediation manager 268. The memory 230 may include both volatile and non-volatile memory.

Raw-in processing 262 includes software components that work in connection with hardware and/or firmware of detectors in the measurement circuitry 226, to assist in measuring and/or detecting audio factors that pertain to incoming audio signals, i.e., signals to be played on speakers 212. Raw-out processing 264 performs a similar role for detectors monitoring audio factors of outgoing audio signals, which include signals from the microphone 210. Audio quality renderer 266 receives estimates 148 of overall audio quality and renders them on display 214, e.g., as simulated gauges, bars, colors, and/or text, for example. Remediation manager 268 receives messages 152 and/or remedial actions 154, rendering the messages 152 on display 214 and implementing the remedial actions 154. For example, implementing a remedial action 154 might involve directing the set of network interfaces 222 to connect to a different network, directing the codec 250 to change its sampling rate, or directing an amplifier connected to the microphone 210 to increase its gain.

Figure 3:
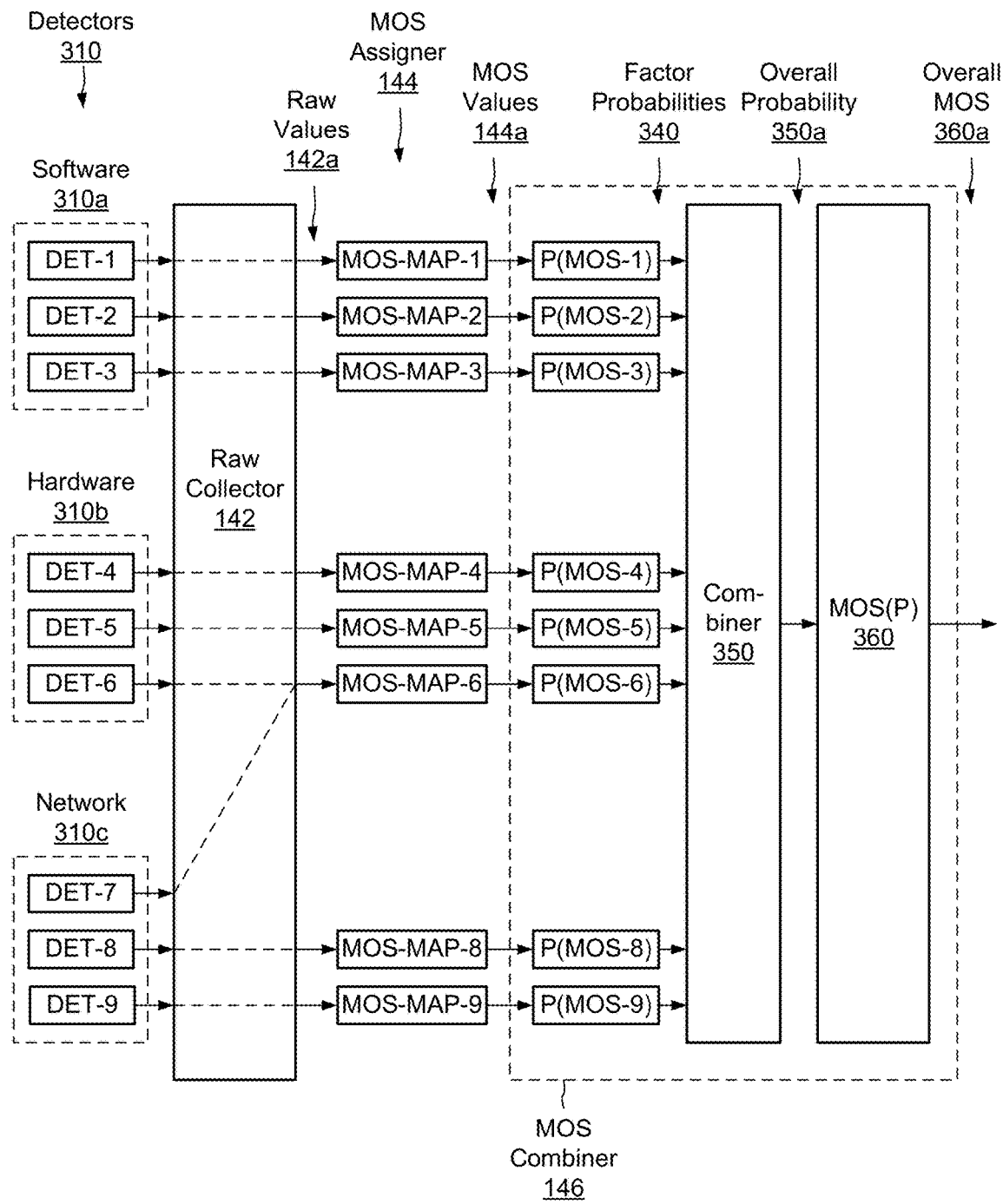
FIG. 3 is a block diagram of an example flow of operations for measuring audio quality.

FIG. 3 shows an example arrangement for measuring audio factors and processing them to produce overall estimates of audio quality. Here, detectors 310 of audio factors include software detectors 310a (DET-1, DET-2, and DET-3), hardware detectors 310b (DET-4, DET-5, and DET-6), and network detectors 310c (DET-7, DET-8, and DET-9), which measure audio factors that result from operation of hardware, software, and network components, respectively. Even though they are shown together, the detectors 310 may be physically distributed in any suitable way across the environment 100. It is assumed for this example that the detectors 310 have already been grouped for purposes of generating a desired measure of audio quality. For example, the detectors 310 may all relate to audio quality as rendered on computing device 110(1).

Raw collector 142 (FIG. 1) receives outputs from detectors 310. As shown by dashed lines, outputs of some detectors pass directly through raw collector 142 while outputs of other detectors are combined. Outputs of detectors may be combined when the detectors measure audio characteristics for which poor quality tends to produce a common perceptual effect. Here, outputs of detectors DET-6 and DET-7 combine to produce a single output value. Combining outputs of detectors may involve taking averages of detector values or assigning the output value to be the smallest detector value. For example, if DET-6 produces a raw value of 0.8 and DET-7 produces a raw value of 0.6 (each on a scale of 0-1), the raw collector 142 may assign the output value a score of 0.6. A rationale behind taking a minimum of sub-factor values to produce the output is that a low score in any of the sub-factors will produce the undesired perceptual effect, even if the other sub-factor values are high.

MOS assigner 144 receives raw values 142a from raw collector 142 and processes the respective raw values 142a via respective paths to produce respective MOS values 144a. Each MOS value 144a is produced from output from a respective detector 310 (or group of combined detectors) and is independent of other detectors. For example, MOS-Map-1 receives the output of DET-1 and produces a MOS value 144a for DET-1, which is independent of output from other detectors. Similar operations apply to MOS-Map-2 through MOS-Map-5. For MOS-Map-6, a MOS value 144a is assigned to the combined output of detectors DET-6 and DET-7. Assignments of MOS values 144a may employ mappings generated based on offline testing, as described in connection with FIG. 1.

Each of the MOS values 144a then proceeds to MOS combiner 146. Here, probability estimators P(MOS-1) through P(MOS-6), P(MOS-8), and P(MOS-9) separately transform each MOS value 144a into a respective factor probability 340, where each factor probability 340 represents a probability of bad audio being produced on account of the respective audio factor alone. For example, the factor probability 340 produced by P(MOS-1) is the probability that audio will be bad on account of the particular audio factor as measured by DET-1. Likewise, the factor probability 340 produced by P(MOS-2) is the probability that audio will be bad on account of the particular audio factor as measured by DET-2. In the usual manner, each of the factor probabilities 340 may range from 0 to 1.

Once all factor probabilities 340 have been generated, combiner 350 combines the factor probabilities 340 to produce a single value of overall probability 350a, which represents the overall probability of bad audio taking all audio factors as measured by detectors 310 into account. Combiner 350 may combine factor probabilities 340 in any mathematically sound manner, with a specific example provided further below.

In some examples, once the overall probability 350a has been generated, MOS converter 360 converts the overall probability 350a to an overall MOS value 360a. The MOS combiner 146 may then provide the overall MOS value 360a as the overall measure of audio quality 148.

Thus, the processing of detector outputs involves expressing each audio factor as a MOS value 144a, converting each MOS value 144a to a respective factor probability 340, combining the factor probabilities 340 to produce an overall probability 350a, and expressing the overall probability 350a as an overall MOS value 360a. Example statistical methods for converting MOS values 144a to factor probabilities 340 and for converting the overall probability 350a to the overall MOS value 360a will now be described with reference to FIGS. 4-9.

Figure 4:
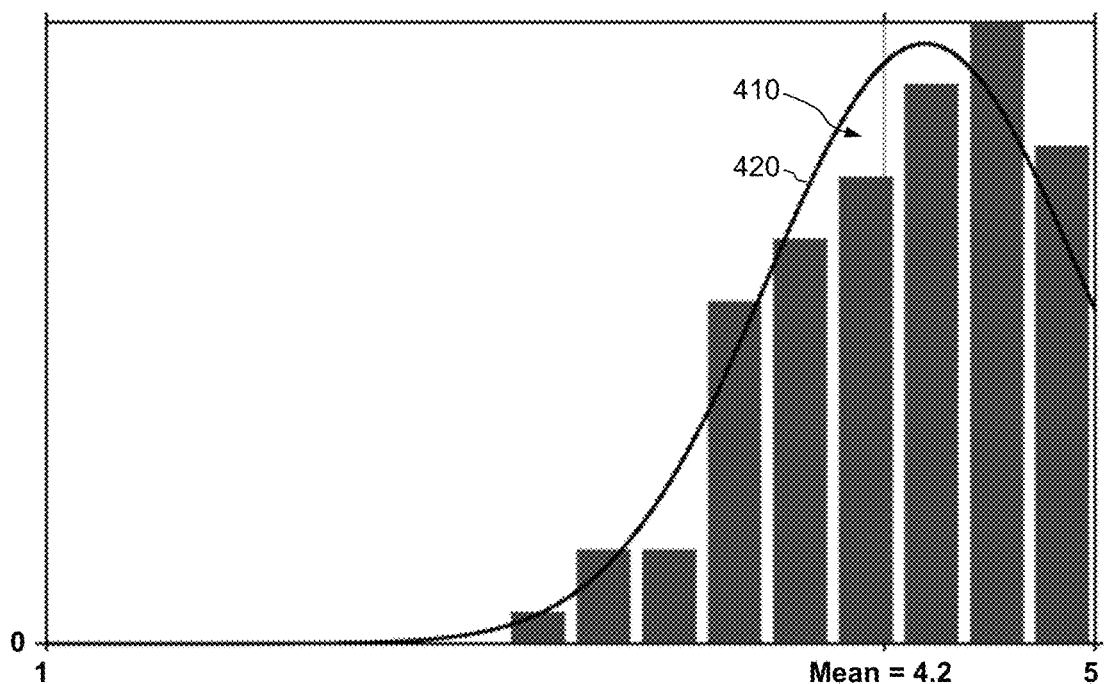
FIG. 4 is a graph showing an example reference distribution of discrete quality values for a reference audio signal and an approximation of the same reference distribution using a truncated Gaussian function.

FIG. 4 shows an example reference distribution (bar graph 410) of discrete quality values which may be assigned by human subjects to a reference audio signal. FIG. 4 also shows an approximation 420 of the same reference distribution using a truncated Gaussian function.

Bar graph 410 may be obtained, for example, by playing a reference audio signal (having no degradation) to a group of human listeners and soliciting their subjective evaluations of quality on a scale of 1 to 5. The bar graph 410 relates opinion scores on the horizontal axis to frequencies of those opinion scores on the vertical axis. Owing to the natural variability of subjective impressions, listener scores will fall into a distribution, despite all listeners hearing the same, high-quality audio. The mean score in this case is 4.2 and directly provides a mean opinion score (MOS value) of the reference audio signal.

The truncated Gaussian distribution 420 is constructed as an approximation of the bar graph 410 by distribution-fitting techniques known to those skilled in the art. Other curve shapes besides truncated Gaussians may be used, e.g., if other curve shapes provide better fits to the shapes of the distributions.

Figure 5A:
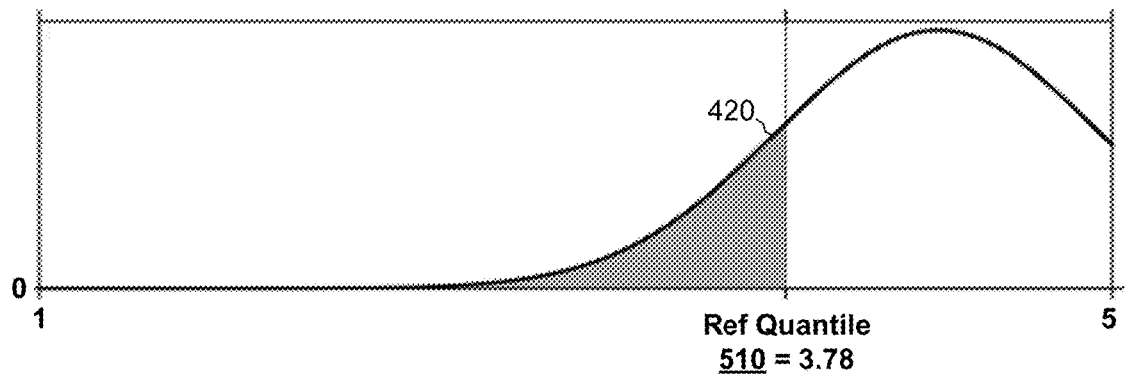
FIGS. 5A and 5B are graphs respectively showing (A) the approximated reference distribution from FIG. 4 and (B) a CDF (cumulative distribution function) of the reference distribution shown in FIG. 5A.
Figure 5B:
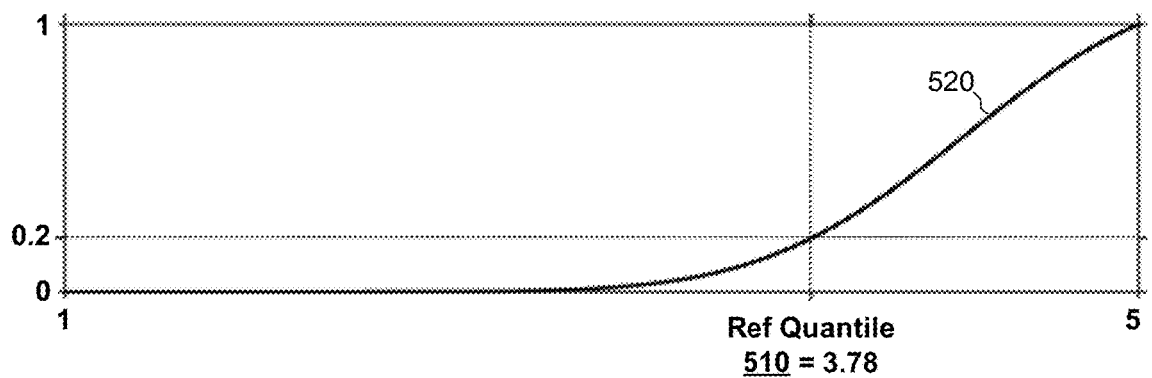

FIG. 5A shows the same truncated Gaussian approximation 420 as in FIG. 4, and FIG. 5B shows a CDF (cumulative distribution function) 520 of the truncated Gaussian 420, i.e., the integral of distribution 420. In the example shown, we define a "reference quantile" 510 as a standard for distinguishing "good audio" from "bad audio." For example, we assign any score above the reference quantile 510 as good audio and any score below the reference quantile as bad audio. The reference quantile 510 may represent any percentile value of the distribution 520. In the example shown, we define the reference quantile 510 as the 20$^{th}$ percentile of the distribution 420, which corresponds here to a score of 3.78. According to this scheme, MOS values above 3.78 are good audio and scores below 3.78 are bad audio.

Figure 6A:
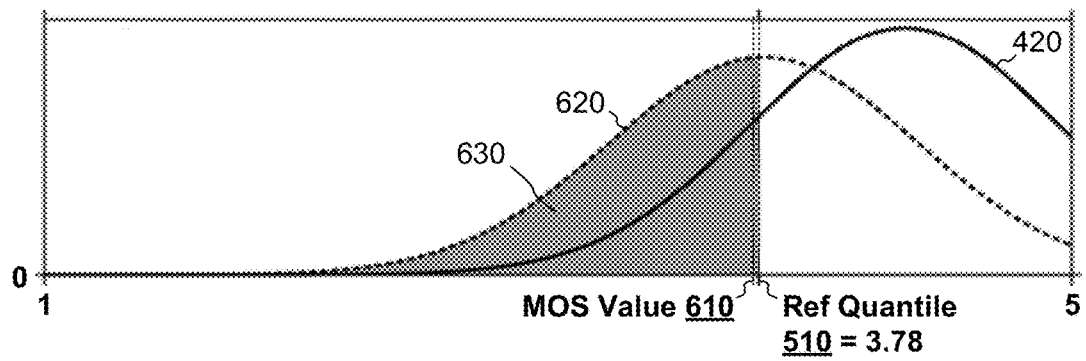
FIGS. 6A and 6B are graphs respectively showing (A) a comparison between the reference distribution (solid) of FIG. 5A and a factor distribution (dashed) for a first audio factor and (B) a CDF of the factor distribution of the first audio factor.

FIG. 6A shows a MOS value 610 for a particular audio factor superimposed over the same distribution 420 as in FIGS. 4 and 5A. For example, MOS value 610 represents a MOS value 144a produced by the MOS assigner 144 in response to a particular raw value 142a, which corresponds to a somewhat degraded audio factor. As explained previously, MOS assigner 144 may assign this MOS value by mapping a raw value to a MOS value, where the mapping is established based on prior, offline characterization.

Using this MOS value 610, MOS combiner 146 may convert the MOS value 610 to a factor probability 340, i.e., a probability of bad audio for the particular factor alone, as follows. First, MOS combiner 146 constructs a distribution 620 around MOS value 610, e.g., by assuming a truncated Gaussian curve shape whose mean is MOS value 610 and whose standard deviation is provided based on prior characterization. For example, if prior characterization of MOS values based on raw scores was conducted using human subjects, then a suitable standard deviation may be obtained based on standard deviations seen in the human test data. Alternatively, a standard deviation may simply be assumed, e.g., based on what is normally seen in human opinion scores. In some examples, a larger standard deviation may be assumed when the MOS value 610 is lower and a smaller standard deviation may be assumed when the MOS value 610 is larger, to reflect the observation that lower MOS scores are often associated with larger ranges of opinion scores.

Second, once the distribution 620 is established, MOS combiner 146 may compute an integral of the constructed distribution 620 from 1 up to the reference quantile (3.78 in the example shown). This integral is represented by the shaded area 630 under the constructed distribution 620.

Figure 6B:
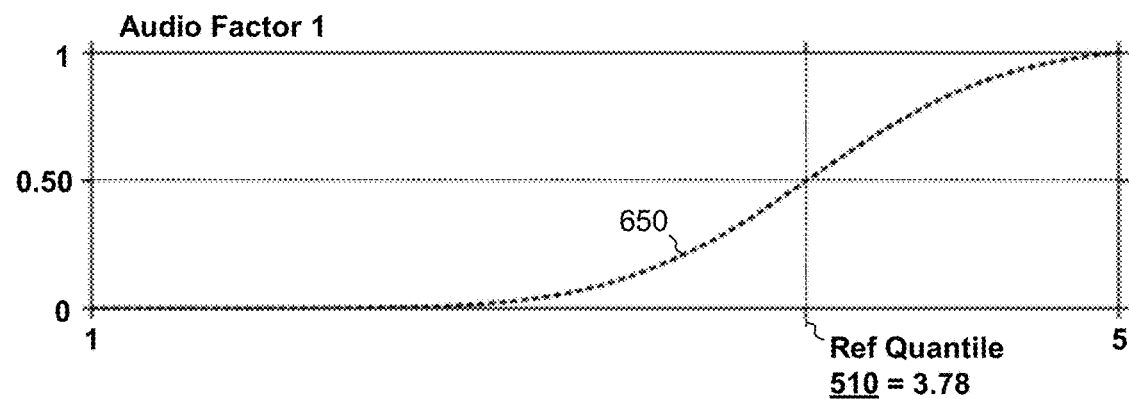

FIG. 6B shows the CDF 650 of the constructed distribution 620 and allows the desired integral to be read directly, i.e., as the CDF value that corresponds to the reference quantile. The CDF value in this case is 0.50. Given the conventions established above, the factor probability 340 for the particular audio factor represented by MOS value 610 is thus 0.50, which may also be regarded as the probability of bad audio arising from the particular audio factor alone.

Figure 7:
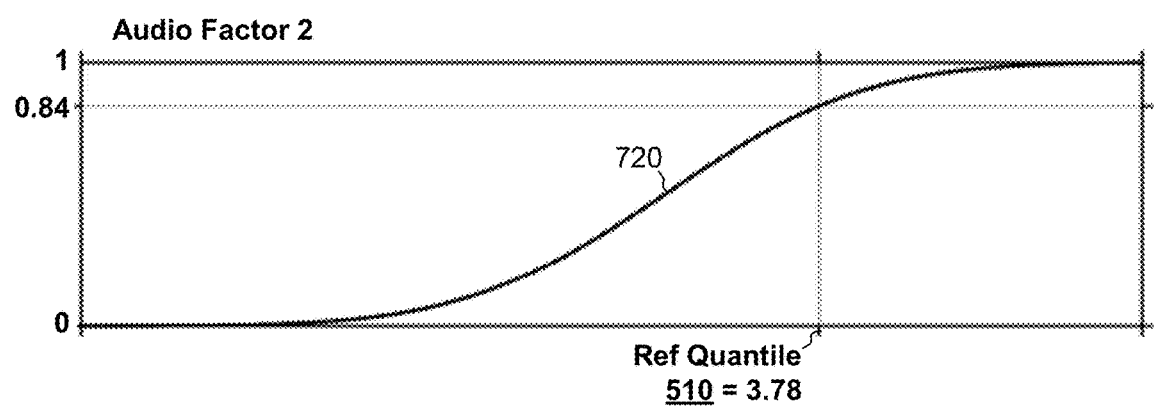
FIG. 7 is a graph showing a CDF of a factor distribution of a second audio factor.

MOS combiner 146 may use the technique described above to convert each of the MOS values 144a to a corresponding factor probability 340. For example, FIG. 7 shows a factor probability 340 of 0.84 for a second audio factor, e.g., as read from CDF curve 720 for the second audio factor.

In some examples, the technique normalizes factor probabilities 340 such that the reference quantile 510 always maps to 0.5. The interpretation is that if you have a CDF value located at the split between good audio and bad audio, you are in a 50/50 position to select either one of them, thus giving a factor probability of 0.5. To map CDF to a factor probability, we may apply any function that maps the range [0, 1] onto itself (with 0 mapping to 0 and 1 mapping to 1) but maps the reference quantile 510 onto 0.5. For example, the function would map our reference quantile of 0.2 to 0.5.

An example mapping of this kind is the Möbius transform, which may be expressed as follows:

$$d_i = \frac{(1-q)p_i}{q+(1-2q)p_i}, \quad \text{(EQ. 1)}$$

where q is the quantile (0.2 in this example), $p_i$ is the factor probability (0.50 for the first audio factor or 0.84 for the second audio factor), and $d_i$ is the remapped factor probability. Here, $d_i$ is 0.8 for the first audio factor (FIG. 6B) and 0.95 for the second audio factor (FIG. 7). Note that $d_i$ simply becomes $p_i$ when q is 0.5, i.e., when the reference quantile 510 is the median of the reference distribution 420.

Once all MOS values 144a have been expressed as corresponding factor probabilities 340 and mapped using the Möbius transform as above, combiner 350 may combine the mapped factor probabilities to produce an uncorrected overall probability. For example, combiner 350 may take the product of all mapped factor probabilities $d_i$ and divide that product by the sum of (1) the product of all mapped factor probabilities and (2) the product of complements of all mapped factor probabilities. This operation may be expressed by the following equation:

$$P_Y = \frac{\Pi_{i=1}^{N} d_i}{\Pi_{i=1}^{N} d_i + \Pi_{i=1}^{N} (1 - d_i)} \quad \text{(EQ. 2)}$$

where $P_Y$ is the uncorrected overall probability, N is the total number of factor probabilities 340, $d_i$ is the i-th mapped factor probability, and $(1-d_i)$ is the complement of the i-th mapped factor probability.

The combiner 350 may then operate an inverse Möbius transform to generate corrected overall probability 350a. For example, combiner 350 may calculate corrected overall probability 350a as follows:

$$P = \frac{qP_Y}{1-q-(1-2q)P_Y}. \quad \text{(EQ. 3)}$$

Note that P equals $P_Y$ when the reference quantile 510 is selected to be the median, i.e., when q=0.5.

In some examples, MOS combiner 146 may use the overall probability 350a as a measure of overall audio quality 148 and take no action to convert the overall probability 350a to a MOS value. Conversion to a MOS value is preferred, however, as MOS values provide a more recognizable standard for representing audio quality.

Figure 8A:
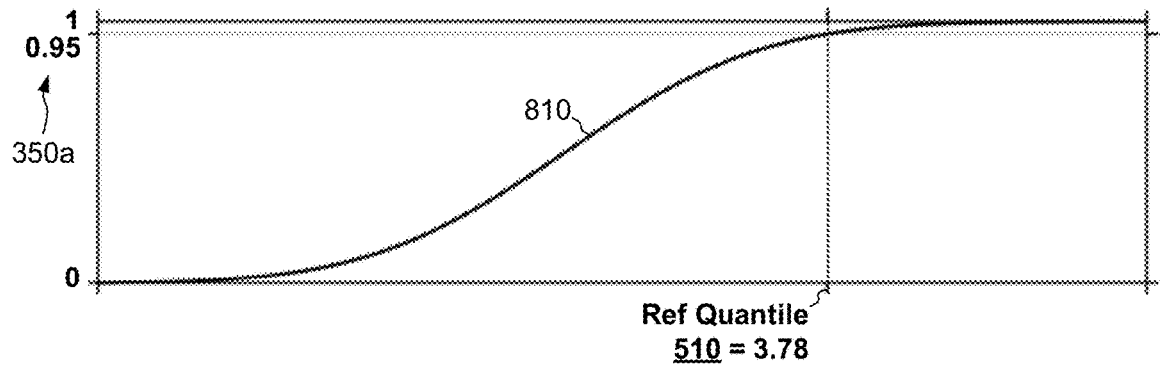
FIGS. 8A and 8B are graphs respectively showing (A) a constructed CDF that provides an overall probability of bad audio at a reference quantile of the reference distribution and (B) a constructed Gaussian function underlying the CDF of FIG. 8A.
Figure 8B:
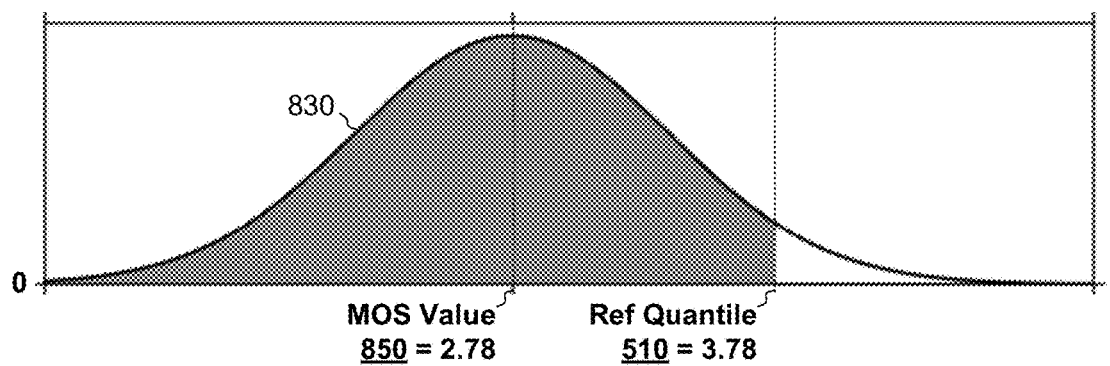

FIGS. 8A and 8B show an example arrangement for converting the overall probability 350a to the overall MOS value 360a. In the example shown, after combining all factor probabilities 340 and correcting the result, combiner 350 has computed the overall probability 350a to be 0.95. The task now is to construct a new distribution 710 whose CDF maps the overall probability 350a to the reference quantile 510 (3.78 in the example shown).

FIG. 8A shows an example CDF 810 that meets the requirements. The shape of the CDF 810 may be assumed the same way as before, e.g., as a truncated Gaussian distribution having a known standard deviation but an unknown mean. In an example, the well-known Newton Raphson method may be used to identify the mean. For example, a trial mean is selected and an integral of the distribution is evaluated at the reference quantile, which is a known point (here, 3.78, 0.95). If the integral matches the overall probability 350a to within acceptable limits, then the mean of the distribution is considered to have been found. Otherwise, a new mean is selected, the integral is repeated on the distribution with the new mean, and the overall probability is evaluated again. The process is repeated for different values of the mean until the computed probability matches the overall probability 350a to within the acceptable limits. Once the MOS Combiner 146 has established the CDF 810, it may generate distribution 830 (FIG. 8B) as the derivative of CDF 810. As distribution 830 represents a constructed distribution of opinion scores, the mean 850 of distribution 830 provides a mean opinion score (MOS 2.78), which provides the desired overall MOS value 360a. MOS combiner 146 may then use the overall MOS value 360a as the overall measure of audio quality 148.

Figure 9:
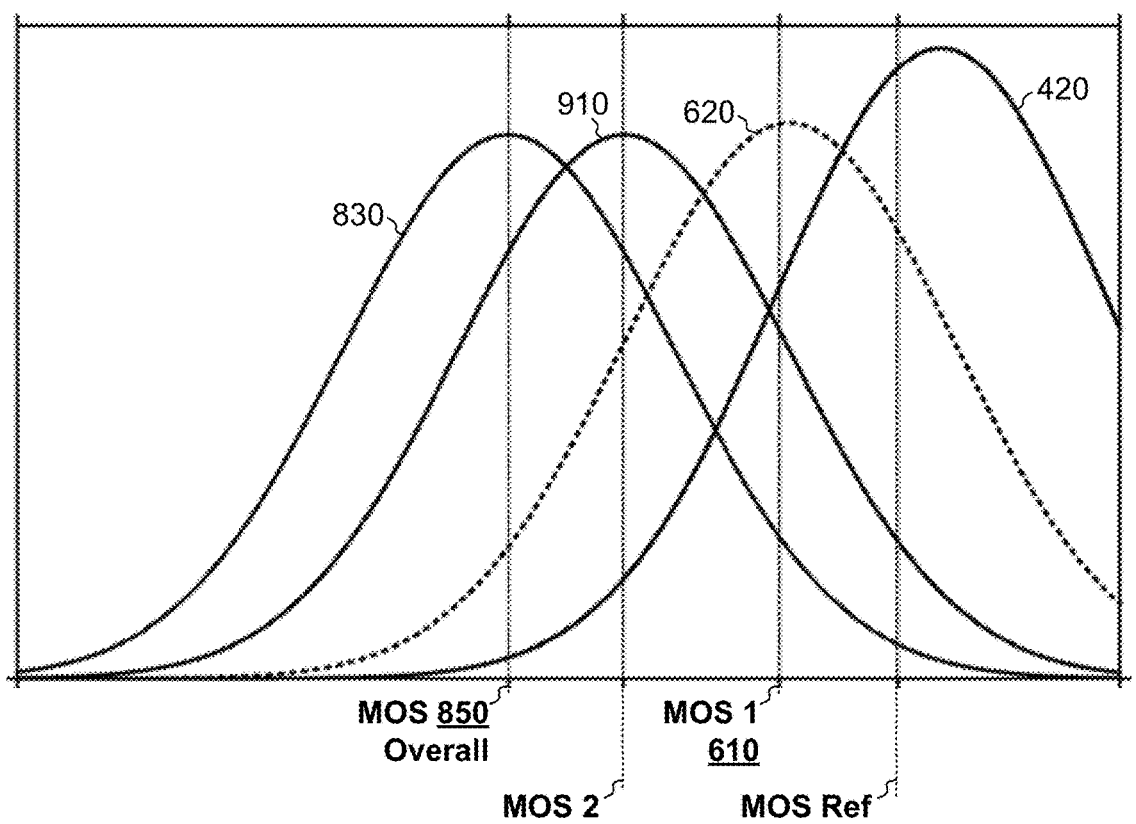
FIG. 9 is a graph showing multiple distributions as described in connection with FIGS. 4 through 8B.

FIG. 9 shows the distributions and associated MOS values as described in the foregoing example. Here, the reference distribution 420 has a MOS value "MOS Ref" of 4.2 (FIG. 4). The distribution 620 of the first audio factor has a MOS value 610 of approximately 3.78 (FIG. 6A), and a distribution 910 of the second audio factor (FIG. 7) has a MOS value of "MOS 2." The overall distribution 830 has a MOS value 360a of 2.78 (FIG. 8B). The example shows that the overall MOS value 360a is slightly lower than the MOS values for the first and second audio factors but that the effects of distortion are not directly additive. Rather, the particular manner of combining factor probabilities, as described in EQs. 1-3, takes into account the fact that audio distortions do not combine additively when perceived by human subjects.

Figure 10:
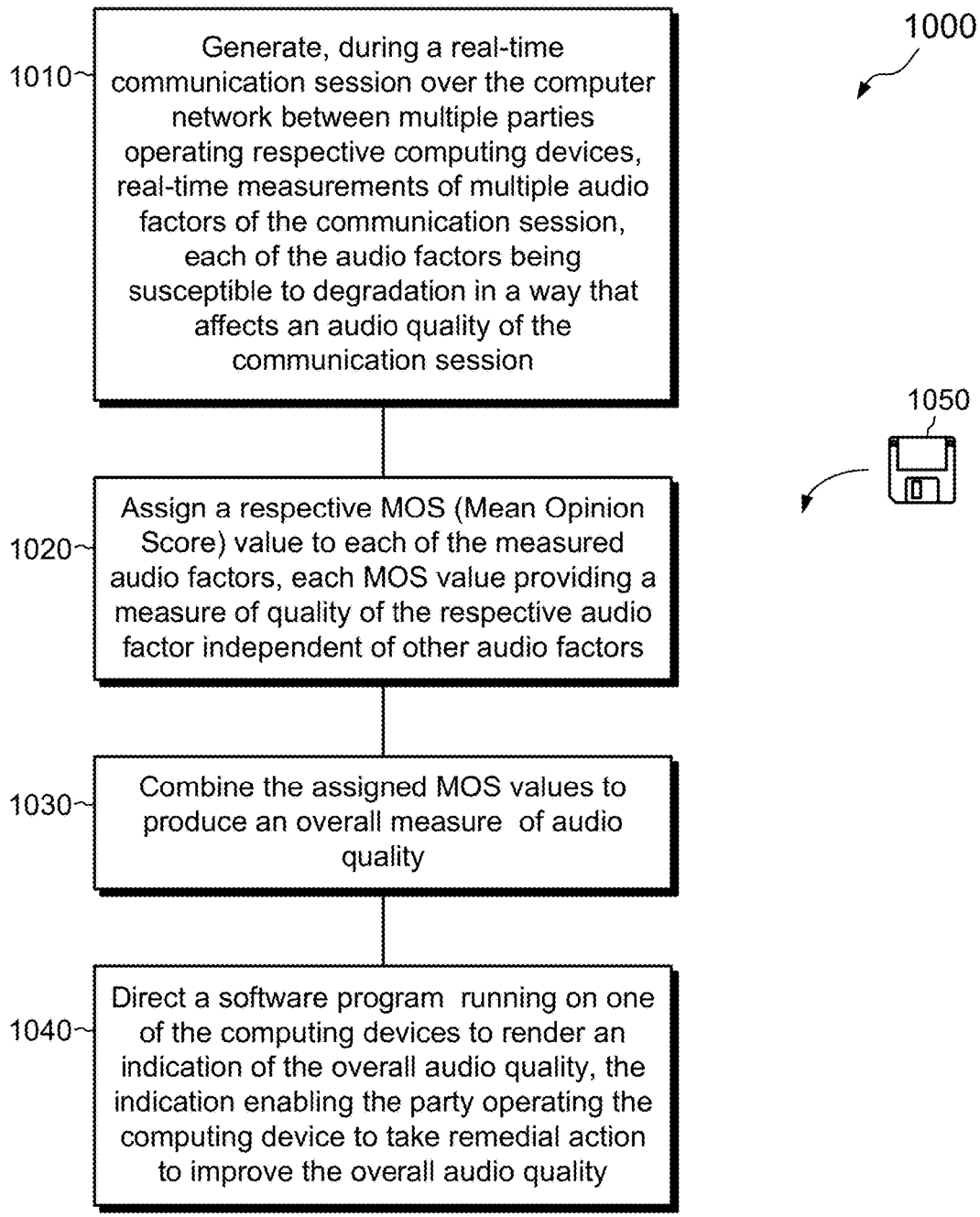
FIG. 10 is a flowchart showing an example method of estimating audio quality in real-time communications over a computer network.

FIG. 10 shows an example method 1000 that may be carried out in connection with the environment 100. The method 1000 is typically performed, for example, by the software constructs described in connection with FIG. 1, which reside in the memory 140 of the conferencing server 130 and are run by the set of processors 132. The various acts of method 800 may be ordered in any suitable way. Accordingly, embodiments may be constructed in which acts are performed in orders different from that illustrated, which may include performing some acts simultaneously.

At 1010, during a real-time communication session over a computer network 120 between multiple parties 108 operating respective computing devices 110, real-time measurements 142a are generated of multiple audio factors of the communication session. Each of the audio factors is susceptible to degradation in a way that affects an audio quality of the communication session.

At 1020, a respective MOS (Mean Opinion Score) value 144a is assigned to each of the measured audio factors. Each MOS value 144a provides a measure of quality of the respective audio factor independent of other audio factors. MOS values 144a may be assigned, for example, by applying mappings based on data collected offline.

At 1030, the assigned MOS values 144a are combined to produce an overall measure of audio quality, such as an overall probability 350a of bad audio and/or an overall MOS value 360a. For example, the methodology described in connection with FIGS. 4-7 may be applied to transform MOS values 144a to respective factor probabilities 340, to combine the factor probabilities 340 to arrive at an overall probability 350a of bad audio, and to transform the overall probability 350a of bad audio into an overall MOS score 360a.

At 1040, a software program 260 running on one of the computing devices 110 is directed to render an indication 148 of the overall audio quality, the indication enabling the party 108 operating the computing device 110 to take remedial action to improve the overall audio quality.

An improved technique has been described for estimating and enhancing audio quality in a real-time communication session between parties over a computer network. The technique produces real-time measurements of factors that are known to impact audio quality, assigns a separate MOS value to each of the measured factors, and combines the MOS values for the various factors to produce an overall measure of audio quality. At least one party to the real-time communication session operates a computing device that runs a software program, and the technique further includes directing the software program to render an indication of the overall audio quality, thereby enabling the party operating the computing device to take remedial action to improve the audio quality.

Having described certain embodiments, numerous alternative embodiments or variations can be made. For example, alternative embodiments may omit the conferencing server 130 and/or may use methods for combining MOS values that differ from the particular methods shown.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 850 in FIG. 8). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of improving audio quality in real-time communications over a computer network, the method comprising:
   generating, during a real-time communication session over the computer network between multiple parties operating respective computing devices, real-time measurements of multiple audio factors of the communication session, each of the audio factors being susceptible to degradation in a way that affects an overall audio quality of the communication session;
   assigning a respective MOS (Mean Opinion Score) value to each of the measured audio factors, each MOS value providing a measure of quality of the respective audio factor independent of other audio factors;
   combining the assigned MOS values to produce an overall measure of audio quality; and
   directing a software program running on one of the computing devices to render an indication of the overall measure of audio quality, the indication enabling the party operating said one of the computing devices to take remedial action to improve the overall audio quality.

2. The method of claim 1, wherein combining the assigned MOS values is performed by a server apparatus coupled to each of the computing devices over the computer network, and wherein the method further comprises the server apparatus directing the software program to display a message on said one of the computing devices, the message providing a recommendation of a particular remedial action for improving the overall audio quality.

3. The method of claim 1, wherein combining the assigned MOS values is performed by a server apparatus coupled to each of the computing devices over the computer network, and wherein the method further comprises the server apparatus directing the software program to change a setting to improve the overall audio quality.

4. The method of claim 3, wherein the method further comprises the server apparatus:
   generating a per-party audio quality measure for each party to the real-time communication session, and
   directing the software program to render a respective indication of the per-party audio quality measure for each party to the real-time communication session, such that the party operating the respective computing device is enabled to see, via the software program, the respective indication of the per-party audio quality measure of each other party participating in the real-time communication session.

5. The method of claim 3, wherein assigning a respective MOS value to each of the measured audio factors includes:
   receiving the measured audio factor as a raw value; and
   converting the raw value to the respective MOS value.

6. The method of claim 5, wherein converting the raw value to the respective MOS value includes, for at least one measured audio factor:
   performing prior off-line testing on human subjects, the human subjects assigning subjective quality scores to audio at each of multiple raw value levels of the audio factor, each of the multiple raw value levels corresponding to a respective level of audio degradation in the audio factor with all other audio factors held constant;
   computing a mean quality score across the human subjects for each of the multiple raw value levels;
   constructing a mapping that associates raw value levels with corresponding mean quality scores; and
   applying the mapping to convert the raw value to the respective MOS value.

7. The method of claim 5, wherein converting the raw value to the respective MOS value includes, for at least one measured audio factor:
   performing prior off-line characterization of multiple raw value levels of the audio factor using VQT (Voice Quality Testing), the characterization using VQT providing a mapping between the raw value levels and corresponding MOS values; and
   applying the mapping to convert the raw value to the respective MOS value.

8. The method of claim 5, wherein combining the assigned MOS values to produce the overall measure of audio quality includes converting each of the assigned MOS values to a corresponding factor probability, each factor probability indicating a probability that the respective MOS value indicates bad audio.

9. The method of claim 8, wherein the method further comprises identifying a reference quantile, the reference quantile representing a particular percentile opinion score that subjective human listeners have assigned to un-degraded reference audio, and wherein converting each of the assigned MOS values to a respective factor probability includes, for each of the assigned MOS values:
   constructing a distribution of quality values whose mean equals the assigned MOS value;
   computing a cumulative probability value as a summation of the constructed distribution of quality values up to the reference quantile; and
   providing the cumulative probability value as the factor probability.

10. The method of claim 9, wherein combining the assigned MOS values to produce the overall measure of audio quality further includes combining the factor probabilities to generate an overall probability of bad audio.

11. The method of claim 10, wherein combining the factor probabilities includes computing the overall probability of bad audio as a product of the factor probabilities divided by a sum of (i) the product of the factor probabilities and (ii) a product of complements of the factor probabilities.

12. The method of claim 10, wherein combining the assigned MOS values to produce the overall measure of audio quality further includes converting the overall probability of bad audio to an overall MOS value.

13. The method of claim 12, wherein converting the overall probability of bad audio to the overall MOS value includes:
   constructing an overall distribution whose CDF (cumulative distribution function) maps the overall probability of bad audio to the reference quantile; and
   providing the overall MOS value as a mean of the overall distribution.

14. The method of claim 5, wherein at least one of the multiple audio factors includes multiple sub-factors having different causes but contributing to a common perceptual effect.

15. The method of claim 14, wherein the multiple sub-factors for one of the multiple audio factors include (i) packet loss in transmitting audio between two of the computing devices and (ii) clipping of audio signals.

16. A computerized apparatus, comprising control circuitry that includes a set of processing units coupled to memory, the control circuitry constructed and arranged to:
generate, during a real-time communication session over a computer network between multiple parties operating respective computing devices, real-time measurements of multiple audio factors of the communication session, each of the audio factors being susceptible to degradation in a way that affects an overall audio quality of the communication session;
assign a respective MOS (Mean Opinion Score) value to each of the measured audio factors, each MOS value providing a measure of quality of the respective audio factor independent of other audio factors;
combine the assigned MOS values to produce an overall measure of audio quality; and
direct a software program running on one of the computing devices to render an indication of the overall measure of audio quality, the indication enabling the party operating said one of the computing devices to take remedial action to improve the overall audio quality.

17. A computer program product including a set of non-transitory, computer-readable media having instructions which, when executed by control circuitry of a computerized apparatus, cause the control circuitry to perform a method for improving audio quality in real-time communications over a computer network, the method comprising:
generating, during a real-time communication session over the computer network between multiple parties operating respective computing devices, real-time measurements of multiple audio factors of the communication session, each of the audio factors being susceptible to degradation in a way that affects an overall audio quality of the communication session;
assigning a respective MOS (Mean Opinion Score) value to each of the measured audio factors, each MOS value providing a measure of quality of the respective audio factor independent of other audio factors;
combining the assigned MOS values to produce an overall measure of audio quality; and
directing a software program running on one of the computing devices to render an indication of the overall measure of audio quality, the indication enabling the party operating said one of the computing devices to take remedial action to improve the overall audio quality.

18. The computer program product of claim 17, wherein combining the assigned MOS values to produce the overall measure of audio quality includes converting each of the assigned MOS values to a corresponding factor probability, each factor probability indicating a probability that the respective MOS value indicates bad audio.

19. The computer program product of claim 18, wherein the method further comprises identifying a reference quantile, the reference quantile representing a particular percentile opinion score that subjective human listeners have assigned to un-degraded reference audio, and wherein converting each of the assigned MOS values to a respective factor probability includes, for each of the assigned MOS values:
constructing a distribution of quality values whose mean equals the assigned MOS value;
computing a cumulative probability value as a summation of the constructed distribution of quality values up to the reference quantile; and
providing the cumulative probability value as the factor probability.

20. The computer program product of claim 18, wherein at least one of the multiple audio factors includes multiple sub-factors having different causes but contributing to a common perceptual effect.

\* \* \* \* \*